July 6, 1965 S. J. SKIRPAN 3,193,725
CONTROL SYSTEM FOR SOLID STATE CONTROLLED RECTIFIERS
Filed March 3, 1961 3 Sheets-Sheet 1

INVENTOR.
STEPHEN J. SKIRPAN
BY
Frank G. Brower
his ATTORNEY

July 6, 1965 S. J. SKIRPAN 3,193,725
CONTROL SYSTEM FOR SOLID STATE CONTROLLED RECTIFIERS
Filed March 3, 1961 3 Sheets-Sheet 2

INVENTOR.
STEPHEN J. SKIRPAN
BY
his ATTORNEY

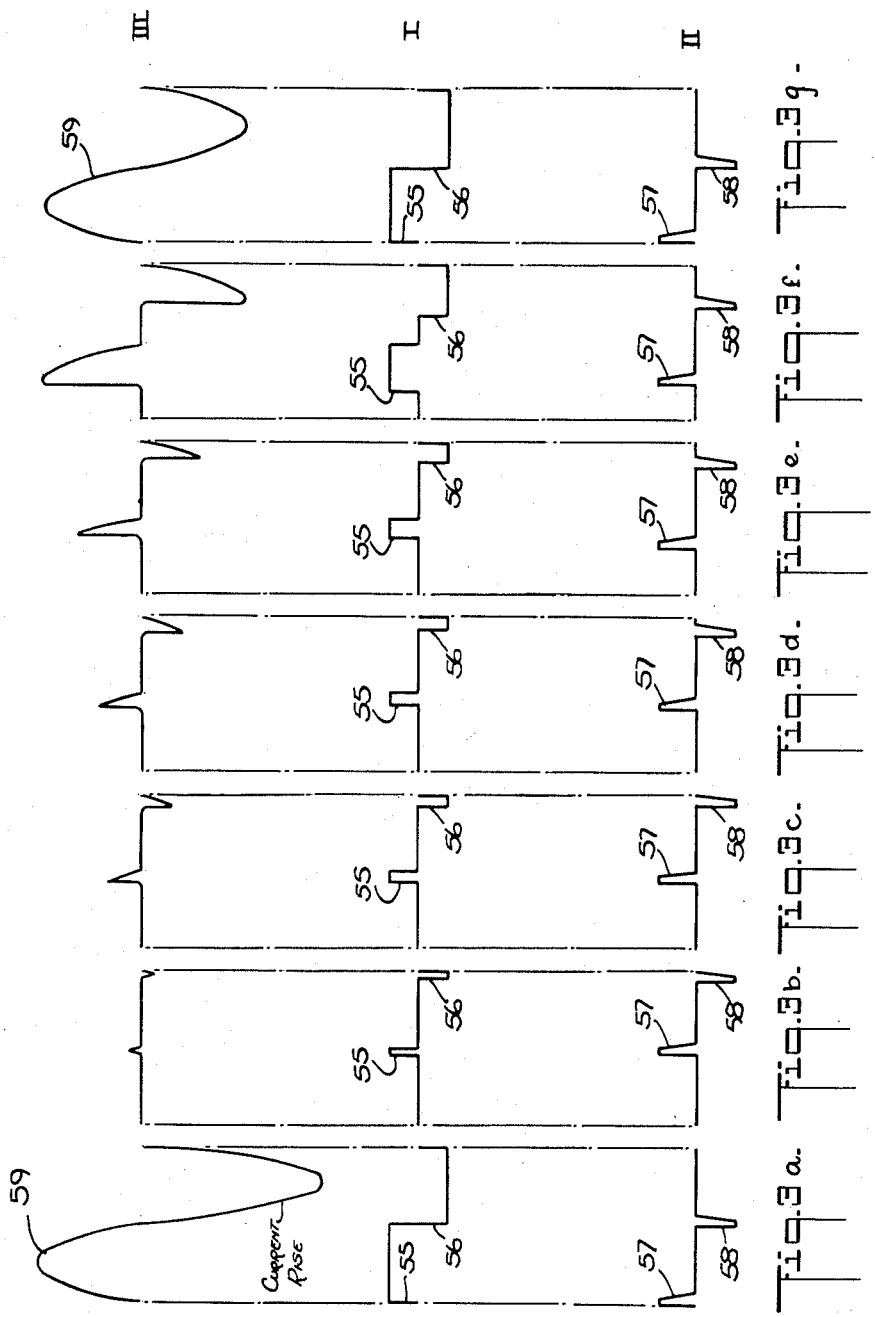

3,193,725
CONTROL SYSTEM FOR SOLID STATE
CONTROLLED RECTIFIERS
Stephen J. Skirpan, Flushing, N.Y., assignor to Ward
Leonard Electric Co., Mount Vernon, N.Y., a corporation of New York
Filed Mar. 3, 1961, Ser. No. 93,253
6 Claims. (Cl. 315—194)

This invention relates to control apparatus having silicon controlled rectifiers to vary the current supplied to incandescent lamps for illumination control.

The utilization of silicon controlled rectifiers as valves for remote control of the amount of current supplied to an incandescent load presents problems of adapting the rectifiers to the vagaries of commercial use without impairing or destroying the rectifiers and securing a prompt and uniform response to the control currents.

The control apparatus should also be compact and relatively free from breakdowns and other difficulties requiring extensive maintenance. For this reason it is desirable to use inert components in the control apparatus, such as inductors and semiconductor devices that are rugged and not readily subject to breakdown.

An object of the invention is to utilize a saturable core reactor device for controlling the gating of the silicon controlled rectifiers that is rapid in operation and provides a fine control of the phase relation of the gate pulse and the line voltage applied to the silicon controlled rectifiers.

Another object of the invention is to provide a remote illumination control apparatus using saturable core reactor type of devices that are accurate and provide square law control characteristics between the control position and the light output of the lamps connected to the apparatus.

Another object of the invention is to provide instant automatic current limiting against excessive surge currents through the controlled rectifiers by retarding the control apparatus when an overload condition is sensed with gradual recovery after the transient overload has passed.

Another important object of the invention is to provide a highly filtered output voltage to eliminate audible lamp load filament vibration and radio frequency interference which is common to silicon controlled rectifier devices due to the steep output current rise time that these devices produce.

Still another important object of this invention is to provide gating pulses which have a short duty cycle thereby increasing rectifier longevity by minimizing gate power dissipation.

Another object of this invention is to eliminate the common disadvantage of past art magnetic drivers by providing a relatively constant amplitude gate pulse which greatly increases firing accuracy.

Other and further objects of the invention are set forth in the following description taken in connection with the drawings in which:

FIG. 1 is a diagrammatic illustration of the circuit of the control apparatus;

FIGS. 2a–c are diagrams of various voltages and currents in the apparatus;

FIGS. 3a–g are diagrammatic illustrations of the recovery of the apparatus on occurrence of a surge of current;

Figure 1:
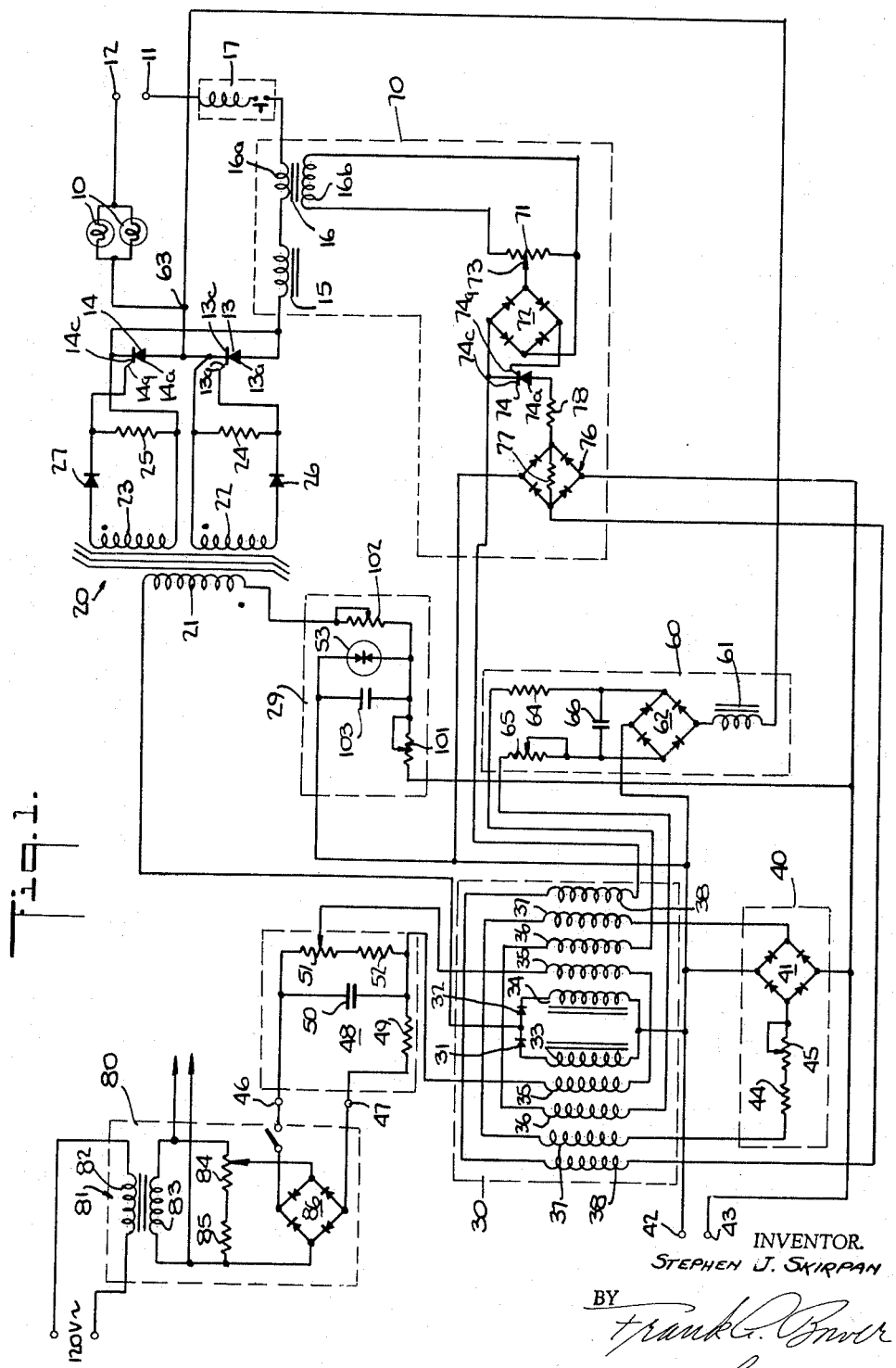

Referring to FIG. 1 the output load comprises one or more incandescent lamps 10 connected in series with an alternating current provided at terminals 11, 12 and the silicon controlled rectifiers 13, 14. The silicon controlled rectifiers are connected in a parallel back to front relation to alternately pass the alternating current. Also connected in series with the lamps 10 and alternating current supply are the choke or reactor 15, the primary winding 16a of the transformer 16 and overload protective device 17, such as a circuit breaker. On conduction of the rectifier 13, current passes from terminal 11 through circuit breaker 17, winding 16a, choke 15, rectifier 13 and lamps 10 to terminal 12. On conduction of the rectifier 14 current flows from terminal 12 through lamps 10, rectifier 14, choke 15, winding 16a, circuit breaker 17 to the terminal 11. The silicon controlled rectifiers are of a conventional type and have anodes 13a, 14a, cathodes 13c, 14c and gate electrodes 13g, 14g. The rectifiers are rendered conductive when the voltage of proper polarity is applied across the anode and cathode and a gate voltage is applied between the cathode and gate electrode of the proper value and polarity.

The conductivity of the silicon controlled rectifiers is initiated by pulses received from the secondary windings 22, 23 of the transformer 20. The secondary windings are connected across the respective resistors 24, 25 through the respective rectifiers 26, 27. The rectifiers limit the pulses to a single polarity. The resistors are bleeders which help provide proper loading for rectifiers 26, 27 and windings 22, 23. The pulses in the secondary winding are produced by the current passing through the primary winding. This current passes through the conductive path formed by the square wave generator 29, primary winding 21, the rectifiers 31, 32 and the anode windings 33, 34 of magnetic amplifier 30.

The magnetic amplifier 30, in addition to the main or anode windings, comprises control windings 35, feedback windings 36, bias windings 37 and blocking or retarding windings 38. Magnetic amplifier 30 is made up of two toroidal cores having square loop characteristics. Each core has five windings. Similar windings on each core are connected in series. The bias winding is connected to a bias circuit 40 which provides a current creating a flux in opposition to the flux of the current passing through the anode windings. The bias circuit comprises a full wave bridge rectifier 41 connected across the alternating supply terminals 42, 43. The direct bias current is supplied through the resistors 44, 45 connected in series with the bias windings 37.

The control windings are provided with a direct control current from the terminals 46, 47 through the filter 48 comprising a series resistor 49, a capacitor 50 connected in parallel and two resistors 51, 52 connected across the terminals. The control current or voltage applied to the terminals 46, 47 is provided by the remote control circuit 80 located at a console or switchboard. The remote control circuit comprises a transformer 81 having a primary winding 82 connected to an alternating source of 120 volts and having a secondary winding 83 to produce 24 volts. The secondary winding is connected across the potentiometer 84 and the series resistor 85. A full wave bridge rectifier 86 is connected across the resistors and produces 24 volts across the output which is connected to the terminals 46, 47 by suitable leads. The potentiometer 84 is mounted in a console or switchboard panel for availability to control the illumination of the lamps. Resistor 51 is of the potentiometer type to permit adjustment of the input control signal so that all lamps respond in the same manner to the same control.

The control windings carry a current which produces a flux that bucks the flux of the bias winding and controls the time of the cycle when the anode winding becomes heavily conductive.

The square wave network 29 comprises a variable resistor 101, a filter capacitor 103, a dual anode Zener clipper 53, and variable resistor 102. Terminals 42 and 43 provide a 60 cycle service across clipper 53 current limited by resistor 101. As the input voltage reaches the Zener voltage of clipper 53, regardless of the polarity, clipper 53 becomes highly conductive. This dynamic change in conductivity depending on the instantaneous line voltage across clipper 53 controls the instantaneous voltage drop across resistor 101 and thereby produces a square wave alternating reference voltage across clipper 53. Variable resistor 102 limits the square wave current through anode windings 33, 34 to a safe value.

The use of a square wave reference voltage as a supply for the anode windings of magnetic amplifier 30 has two important advantages. In prior art magnetic drivers a sine wave reference has been used. Depending upon the conduction angle at which the drive is set the amplitude is constantly variable. Since the silicon controlled rectifier has limited minimum and maximum gate firing voltages, this is an extreme disadvantage. If these prior art drivers are set for positive silicon controlled rectifier firing voltages at low and high conduction angles when their reference voltage is departing from or approaching zero, they reach destructive gate voltages when they are set for a 90 degree conduction angle when their reference voltage is maximum. Conversely, if they are set for a safe value at 90 degrees, they have no accuracy or positive silicon controlled rectifier firing at conduction angles approaching zero degrees or 180 degrees. In the present invention the amplitude of the gate pulse is a constant set by the Zener voltage of clipper 53 regardless of conduction angle. This feature provides accurate positive silicon controlled rectifier firing at all command signals.

The square wave reference voltage also permits the differentiation of the magnetic amplifier output which will be explained in detail later.

The magnetic amplifier has a sharp saturating characteristic. As soon as the flux of the bias current is overcome by the flux of the anode winding and the control winding, the core of the reactor saturates and a heavy current is passed by the anode windings 33, 34 and the primary winding 21 to produce the voltage pulse. The less the control current the greater the amount of anode current required to produce the saturation. The control current determines the phase angle at which the anode windings will pass a high square wave current for saturating the transformer 20 and producing a gate pulse.

Transformer 20 has a dual function. The first function is to isolate electrically but couple magnetically the two silicon controlled rectifier gate circuits to the driver network.

This transformer is also wound on a core having square loop characteristics and effectively acts as a peaking inductor which induces only a short pulse into the secondaries 22, 23 differentiated from the leading edge of the magnetic amplifier output. The gate duty cycle is, therefore, less than 15% which minimizes junction heating within the silicon controlled rectifiers thereby further protecting these devices and increasing their longevity.

Figures 2A, 2B, 2C:
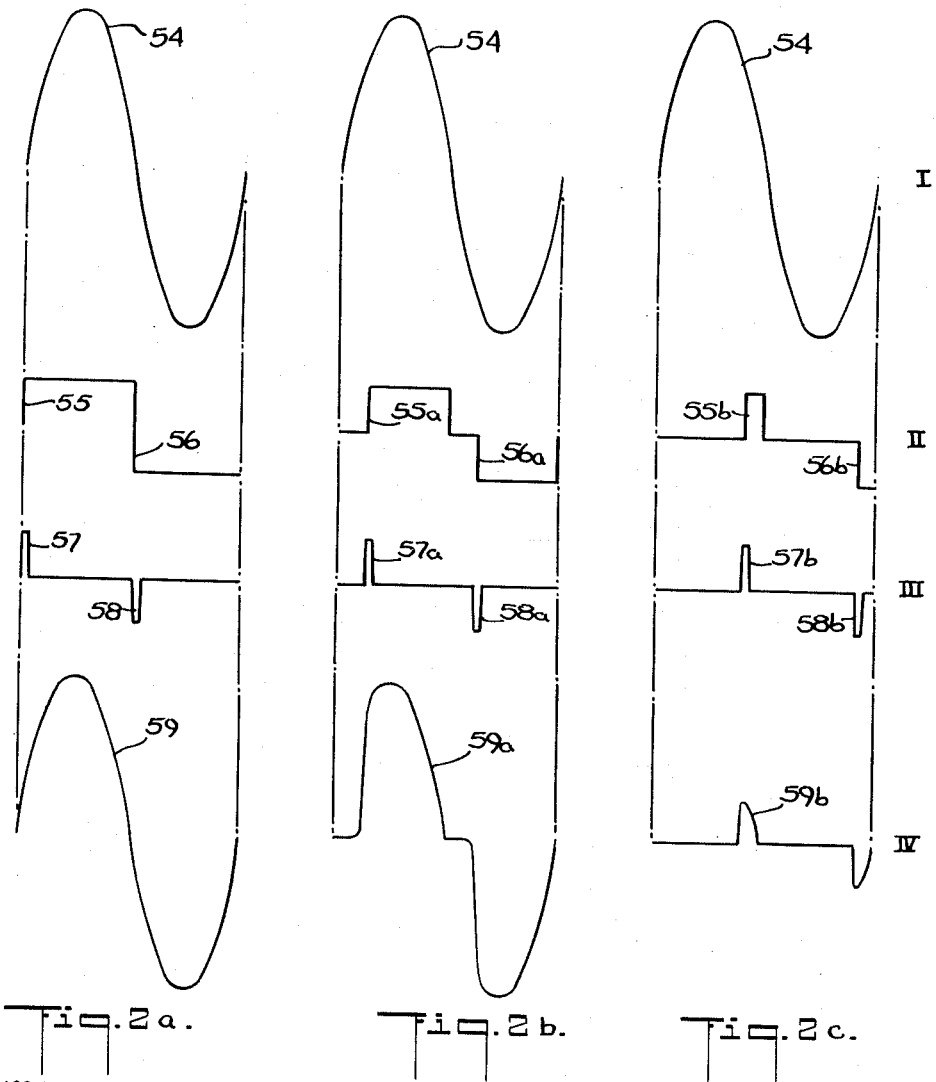

The operation of these elements of the apparatus is illustrated in FIGS. 2a–c. In FIG. 2a the dimming apparatus is at full bright. The control current through the control winding is at its maximum and initiates a prompt saturation by the anode current at the commencement of each half cycle. The Zener clipper is rendered conductive. The alternating current supplied at terminals 42, 43 and 11, 12 is illustrated in row I by the sine wave 54. The square wave produced by network 29 and magnetic amplifier 30 is illustrated in row II with leading edges 55, 56. These leading edges illustrate the rapid rise in current. This rapid rise of the current produces the differentiated current pulses of row III. The pulse 57 is produced by the current change represented by the leading edge 55 and the pulse 58 by the leading edge 56. Since the pulses 57 and 58 each occur at the beginning of the respective half cycle, and are applied to the respective silicon controlled rectifier gate circuits, the full current passes through the silicon controlled rectifiers and load as represented by the sine wave 59 in row IV.

In FIG. 2b the response of the apparatus to reduced control current and lower illumination of lamps 10 is illustrated. The input alternating current from which the square wave current is derived remains the same as illustrated. The decrease in the control current increases the impedance of the anode windings 33, 34 and delays the time in each half cycle when sufficient flux is produced to cause the rapid increase in current. The formation of the leading edges 55a, 56a is thus retarded and the creation of the ignition pulses 57a, 58a is retarded. Wave form 59a of row IV represents the load current under this condition. In FIG. 2c the control current is further reduced to produce a low intensity light. The saturation of the core of the magnetic amplifier is substantially delayed to the second quarter of the cycle. Since the leading edges 55b and 56b and the pulses are delayed until the line voltage has substantially decreased, the load current as represented by the wave form 59b is only a small amount and the lamps are correspondingly low in illumination. The pulse may be shifted approximately 165 degrees over a half cycle. This is a sufficient variation to provide full control from full bright to dimout.

Figure 5:
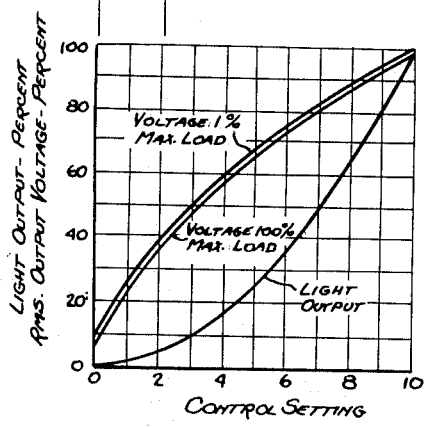
FIG. 5 is an illustration of the various control curves of the device.

The relationship between the control setting and the light output of the connected lamp load follows a square law relationship. That is to say that the square of the control setting, using scaler values from one to ten, equals the percent of lamp light output, i.e. a setting of five equals 25% light. This control characteristic is illustrated in FIG. 5. This relationship is ideal because it provides a linear relationship between control setting and the amount of light perceived by the human eye. This relationship is accomplished by the feedback windings 36 and the feedback circuit 60. The feedback circuit has an inductance or inductor 61 and a full wave rectifier 62 connected between the terminal 63 on the output of the silicon controlled rectifiers and the neutral line connected to the terminal 42. Bridge 62 provides a full wave direct current signal for feedback winding 36. Inductor 61 and capacitor 66 provide a non-linear feedback signal which in turn provides a square law output curve. Resistors 64 and 65 limit the total current in winding 36.

One of the main shortcomings of silicon controlled rectifiers is the immediate destruction by excessive currents. Protective means in the form of a reactor 15, pulse transformer 16, surge suppression network 70 and windings 38 provides a high impedance to a rapid increase in current to limit surge current by the retardation of the ignition pulses. A sharp increase in current produces a pulse in the secondary winding 16b. This pulse is applied to the potentiometer 71. The full wave rectifier 72 is connected across the potentiometer by means of the adjustable tap 73. The output of the rectifier is connected to the gate electron 74g and cathode 74c of the silicon controlled rectifier 74 to apply a direct current pulse to the gate electrode and cathode. The main current for the rectifier 74 is provided by the full wave rectifier 76. The output of the rectifier 76, the silicon controlled rectifier 74 and the winding 38 are connected in series. A bleeder resistor 77 is connected across the output of the rectifier 76 and a resistor 78 is connected in series with the rectifier 74 to limit the current. The pulse impressed by the transformer 16 renders the rectifier 74 conductive and a current is delivered to the reactor windings 38 which immediately retards the operation of the magnetic amplifier so that on the next half cycle the square wave current normally passed through the anode windings is delayed by the high impedance of the windings and an extremely retarded current is passed through the peaking transformer 21. Thus the main rectifiers pass very little output current. The output of the rectifier 76 is not filtered so a pulsating direct current is supplied to the rectifier 74. The rectifier 74 thus becomes non-conductive at the end of the half cycle when the signal current supplied falls to a small value. The magnetic amplifier remains in the depressed state for a few cycles and then recovers in about 20 cycles. The response of the apparatus to the surge current is illustrated in FIGS. 3a–g. Row I illustrates the square wave current, row II the ignition pulses, and row III the output current. The surge may be produced by a short circuit or by cold filaments in the lamps. In the case of the short circuit the reactor 15 delays the current and the slow recovery of the magnetic amplifier provides the time required for the circuit breaker to function. The circuit breaker 17 is fully magnetic and fast acting in order to promptly open the circuit as the current increases above normal due to the continuance of the short circuit. In the case of cold filaments the small increments of output current will heat the filaments so that on complete recovery the lamps will present sufficient resistance.

The wave forms of FIGS. 3a–g are illustrative and are not selected at uniformly spaced intervals. In FIG. 3a the second half of the cycle of the output current indicates a current rise delayed or restricted in amplitude by the reactor 15. The rise produces a suppression of the magnetic amplifier by means of the transformer 16 and the suppression circuit to greatly retard the square wave current. After a few cycles the magnetic amplifier recovers and delayed square wave currents 55, 56 are produced which produce delayed gate pulses 57, 58 and brief firings of the rectifiers 13 and 14 to produce the small current 59 of FIGS. 3c and d. In FIGS. 3e and g the magnetic amplifier recovers still further and in FIG. 3g normal operation is fully restored and the lamps are heated. Thus the silicon controlled rectifiers are protected against current surges.

Figure 4:
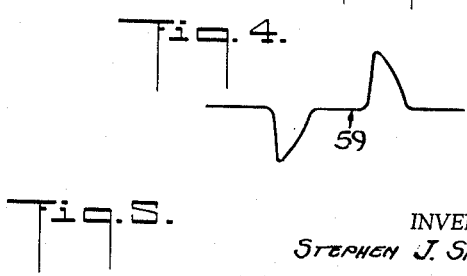
FIG. 4 is an illustration of the filtered output wave form.

Another extreme shortcoming of silicon controlled rectifiers for dimming service is the extremely fast turn on time which they exhibit when they receive gate excitation. Although this is an intrinsic necessity in silicon controlled rectifier design the resultant current rise time in the load circuit which is in the neighborhood of a few microseconds produces two extreme disadvantages. The first disadvantage is audible lamp load filament vibration and the second is a generation of radio frequency interference. Besides helping to limit surges reactor 15 has been designed to have another important characteristic. It increases the load current rise time on each half cycle to greater than 350 microseconds. This makes lamp filament vibration inaudible and decreases radio frequency interference to a very acceptable level. FIG. 4 illustrates the filtered output current of the device.

The control apparatus utilizes resistive, capacitive and inductive core devices as the main elements and thus provides a rugged troublefree unit. The silicon controlled rectifiers, most susceptible to failure, are protected against excessive current surges by the magnetic amplifier suppression unit. The elements are small and capable of being located in a small space. The single largest element is the reactor 15. The silicon controlled rectifiers are small but a large heat sink is required for heat dissipation making the overall size larger than the reactor. However, with these units the overall size of the dimmer is much less than other types of dimmers of the same wattage output. A magnetic amplifier dimmer of similar capacity is five times the weight, and two times the volume.

Of particular note is the wide range of control over each half cycle to provide for the adjustment of illumination from full bright to dimout. The formation of the ignition pulses limits the amount of ignition current provided to the rectifiers 13, 14 and retards the ignition current promptly on surges, thus prolonging the life of the rectifiers. The square law network, magnetic amplifier differentiation network provide accurate safe firing of the rectifiers and with the feedback circuit a compensation is introduced in the magnetic amplifier which varies the output current in a square law relation with the control input impressed across terminals 46, 47 of the control circuit.

It is thus seen from the foregoing description that the dimmer has only inert solid state devices ensuring a minimum of maintenance while providing all of the necessary and desirable electrical characteristics for controlling the illumination of incandescent lamps and preventing damage to the dimmer when improperly connected or subject to excessive currents. Further, the components may be assembled into smaller space than any of the present dimmers for similar purposes without sacrifice of ruggedness or operating performance. The unit may be assembled as a single component and remotely located from the simple control unit 80 and from the lamps 10. The various resistors, condensers and the like are small and may be easily mounted on chassis separable from the dimmer so that a quick change in components may be made to render an inoperable unit operable.

Dimmers may be provided over a range of output ratings, such as two, six, ten kilowatts or higher, depending upon the commercial requirements. The dimmer is capable of dimming any incandescent load from one watt to the rated capacity with the illumination following the standard square law control characteristic. The dimmer may be readily adapted to follow other characteristics by altering the characteristics of the feedback circuit.

More specifically, the dimmer protects the silicon controlled rectifiers from damage and premature aging. The components are of small physical sizes permitting the use of large heat sinks to maintain the stud temperatures within the specified ratings over all conditions of operation and still have the overall dimensions less than comparable dimmers. The components protect the rectifiers against short circuit currents and permit the dimmer to respond to inrush currents without the use of mechanical switches or interlocks in the patch panel or connecting means.

Various modifications and changes may be made in the embodiment without departing from the invention as set forth in the appended claims.

I claim:

1. Apparatus for controlling the load current supplied to an incandescent lamp load comprising first and second silicon controlled rectifiers connected to alternately pass and control the amount of load current supplied to the load, a magnetic amplifier having main windings rapidly saturating to pass a substantially increased current and a control winding producing a flux adjustable to vary the time of saturation of the amplifier during a half cycle, a pulse producing transformer having a primary winding and two secondary windings, means for connecting said secondary windings to a respective rectifier to apply a unidirectional gate pulse to a respective rectifier thereby rendering said rectifiers conductive on alternate half cycles, a rectifying means, means for connecting said main windings, said rectifying means and said primary winding in series across a voltage supply for passing current saturating said magnetic amplifier and thereby causing a rapid increase in current through said primary winding, square wave producing means connected across said main and primary windings to limit the voltage and current thereacross to a given value thereby producing unidirectional gate pulses in said secondary windings of a substantially constant amplitude over the range of phase shift of the gate pulses.

2. Apparatus for controlling the alternating load current supplied to an incandescent load through first and second silicon controlled rectifiers connected to alternately pass and control the amount of current supplied to a load by adjusting the time of conduction of a rectifier during each half cycle comprising means saturating on passage of a given main current to produce a substantial increase in main current, peaking means and square wave producing means connected in series with said saturating means to pass the given main current and the increased main current with the peaking means producing narrow gating pulses from said increased current and the square wave producing means limiting the increased current to a given value to restrict the amplitude of the narrow gating pulses to acceptable values, connection means between said peaking means and said rectifiers to impress said pulses on said rectifiers to control the limit of conduction of said rectifiers and the amount of load current passing therethrough.

3. A lighting control system for controlling the intensity of illumination of incandescent lamps supplied with an alternating current comprising a load circuit; a pulse applying circuit; a pulse applying circuit suppression means; said load circuit connected to an alternating source and including connected in series incandescent lamps, a reactor for initially delaying a surge current, a pulse transformer for detecting a surge and two solid state controlled rectifiers connected to alternately pass and control the amount of current passing through the lamps; means for connecting said pulse applying circuit to said solid state controlled rectifiers to control the conductivity of the load circuit by applying to said rectifiers narrow uniform amplitude gate pulses variable in phase relation to the supplied alternating current; said pulse applying circuit including a peaking transformer having an input and an output connected to said rectifiers, an electromagnetic iron core type control means saturating on passage of a given current to sharply form in the pulse applying circuit an increased current of a substantial amount, a current limiting means connected in parallel with said conrol means and input of said peaking transformer to limit the increased current to a substantially constant value over the range of the phase relation of the pulses and the supplied alternating current, thereby forming in the output of said peaking transformer narrow gating pulses of substantially uniform amplitude over the range of the phase relation for controlling the firing of said rectifiers; said suppression means coupled between said pulse transformer and said control means to retard the gating pulse for each half cycle of the alternating current source on excessive load currents to protect the rectifiers without disrupting the load circuit by providing time for the surge conditions to pass.

4. Apparatus as set forth in claim 2 wherein said square wave producing means comprises a resistor connected in series with said peaking means and said saturating means and a Zener clipper conducting on either polarity of a supply voltage above a set value being connected in parallel with said peaking means and said saturating means to apply a square wave type voltage across said peaking means and said saturating means.

5. Apparatus as set forth in claim 2 wherein said means saturating on passage of a given current to produce a substantial increase in current comprises a magnetic amplifier having two cores each with an anode winding connected in series with said peaking means, control winding, and feedback winding, and there is provided an input control connected to said control winding and, a feedback circuit including an inductor connected to said feedback winding and the output of said rectifiers to impart a square law relation between an input control voltage applied to said control windings and the illumination of the load.

6. Apparatus as set forth in claim 2 wherein said means saturating on passage of a given current to produce a substantial increase in current comprises a magnetic amplifier having anode windings connected in series with said peaking means and having a retarding winding, a retarding circuit is provided comprising a transformer having a primary winding connected in series with said silicon controlled rectifiers and a secondary winding receiving an impulse of current from the primary winding on substantial increase in output current, a feedback silicon controlled rectifier coupled to said secondary and coupled in series with said retarding windings to cause current to flow through said windings on application of a pulse to said retarding rectifier to delay the response of said magnetic amplifier and the gate pulses applied to the load rectifiers thereby reducing the output current.

References Cited by the Examiner
UNITED STATES PATENTS

| 2,395,626 | 2/46 | Higgins | 315—197 X |
| 2,421,994 | 6/47 | Cooper | 315—197 X |
| 2,920,240 | 1/60 | Macklem | 315—200.1 |
| 3,114,097 | 12/63 | Clarke | 321—18 |

OTHER REFERENCES

Electronic Design—"Controlled Rectifier Power Supply is Short Circuit Protected," by Baruch Berman, page 168.

DAVID J. GALVIN, *Primary Examiner.*

ARTHUR GAUSS, JAMES D. KALLAM, *Examiners.*